(12) United States Patent
Shah et al.

(10) Patent No.: US 8,091,072 B2
(45) Date of Patent: Jan. 3, 2012

(54) FRAMEWORK FOR TESTING API OF A SOFTWARE APPLICATION

(75) Inventors: Himesh Shah, Bothell, WA (US); Altaf Gilani, Kenmore, WA (US); Ryan Nakhoul, Bellevue, WA (US); Boulland Wang, Bothell, WA (US); Ronen Yacobi, Seattle, WA (US)

(73) Assignee: Microsoft Corporation, Remond, WA (US)

( * ) Notice: Subject to any disclaimer, the term of this patent is extended or adjusted under 35 U.S.C. 154(b) by 1080 days.

(21) Appl. No.: 11/874,545

(22) Filed: Oct. 18, 2007

(65) Prior Publication Data

US 2009/0106742 A1    Apr. 23, 2009

(51) Int. Cl.
*G06F 9/44* (2006.01)
(52) U.S. Cl. .................. 717/127; 717/124; 717/131
(58) Field of Classification Search .................. None
See application file for complete search history.

(56) References Cited

U.S. PATENT DOCUMENTS

| | | | |
|---|---|---|---|
| 6,321,347 B1 * | 11/2001 | Beeker et al. | 714/28 |
| 6,510,550 B1 | 1/2003 | Hightower et al. | |
| 7,010,454 B1 | 3/2006 | Potter, IV et al. | |
| 7,010,546 B1 | 3/2006 | Kolawa et al. | |
| 7,010,782 B2 | 3/2006 | Narayan et al. | |
| 2005/0060317 A1 | 3/2005 | Lott et al. | |
| 2005/0193291 A1 | 9/2005 | Subramanian et al. | |
| 2005/0204048 A1 | 9/2005 | Pujol et al. | |
| 2006/0195732 A1 | 8/2006 | Deutschu et al. | |
| 2007/0016829 A1 | 1/2007 | Subramanian et al. | |
| 2007/0038890 A1 | 2/2007 | El Far et al. | |
| 2007/0106933 A1 | 5/2007 | Nene et al. | |

OTHER PUBLICATIONS

Calamé et al., Mar. 2006, *Centrum voor Wiskunde en Informatica.*, SEN-E0602: "Towards automatic generation of parameterized test cases from abstractions."

* cited by examiner

*Primary Examiner* — Chuck Kendall
(74) *Attorney, Agent, or Firm* — Merchant & Gould P.C.

(57) ABSTRACT

A test executor for testing an application programming interface of a software application includes a plurality of invokers, a mapper/converter, and a comparer. The plurality of invokers includes a software application invoker and a database application invoker. The software application invoker is adapted to communicate with a software application through an application programming interface of the software application while the database application invoker is adapted to communicate with a database application through an application programming interface of the database application. The mapper/converter is in communication with the plurality of invokers. The mapper/converter converts results from at least one of the software application invoker and the database application invoker into a common data format. The comparer is in communication with the mapper/converter and compares the results in the common data format to assess the functionality of the application programming interface of the software application.

20 Claims, 10 Drawing Sheets

FRAMEWORK FOR TESTING API OF A SOFTWARE APPLICATION

BACKGROUND

Information such as line of business information is often stored in databases on a host system such as a corporate server. In order to access such information, one of many database applications (e.g., Siebel, SAP, CRM, ERP, etc.) may be employed. While such database applications are readily available, the average user often finds such applications difficult to use as a result of the average user's unfamiliarity with the applications' interface.

Software developers have addressed this issue by creating software applications with familiar interfaces that access the information stored in the database. However, there is a need for a test methodology to ensure the accuracy of these software applications.

SUMMARY

An aspect of the present disclosure relates to a test executor for testing an application programming interface of a software application. The test executor includes a plurality of invokers, a mapper/converter, and a comparer. The plurality of invokers includes a software application invoker and a database application invoker. The software application invoker is adapted to communicate with a software application through an application programming interface of the software application while the database application invoker is adapted to communicate with a database application through an application programming interface of the database application. The mapper/converter is in communication with the plurality of invokers. The mapper/converter converts results from at least one of the software application invoker and the database application invoker into a common data format. The comparer is in communication with the mapper/converter and compares the results in the common data format from the mapper/converter to assess the functionality of the application programming interface of the software application.

Another aspect of the present disclosure relates to a method for testing an application programming interface of a software application. The method includes reading a test case data file into a test executor, invoking a plurality of invokers including a software application invoker and a database application invoker in accordance with the test case data file, and comparing the results returned from the software application invoker and the database application invoker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
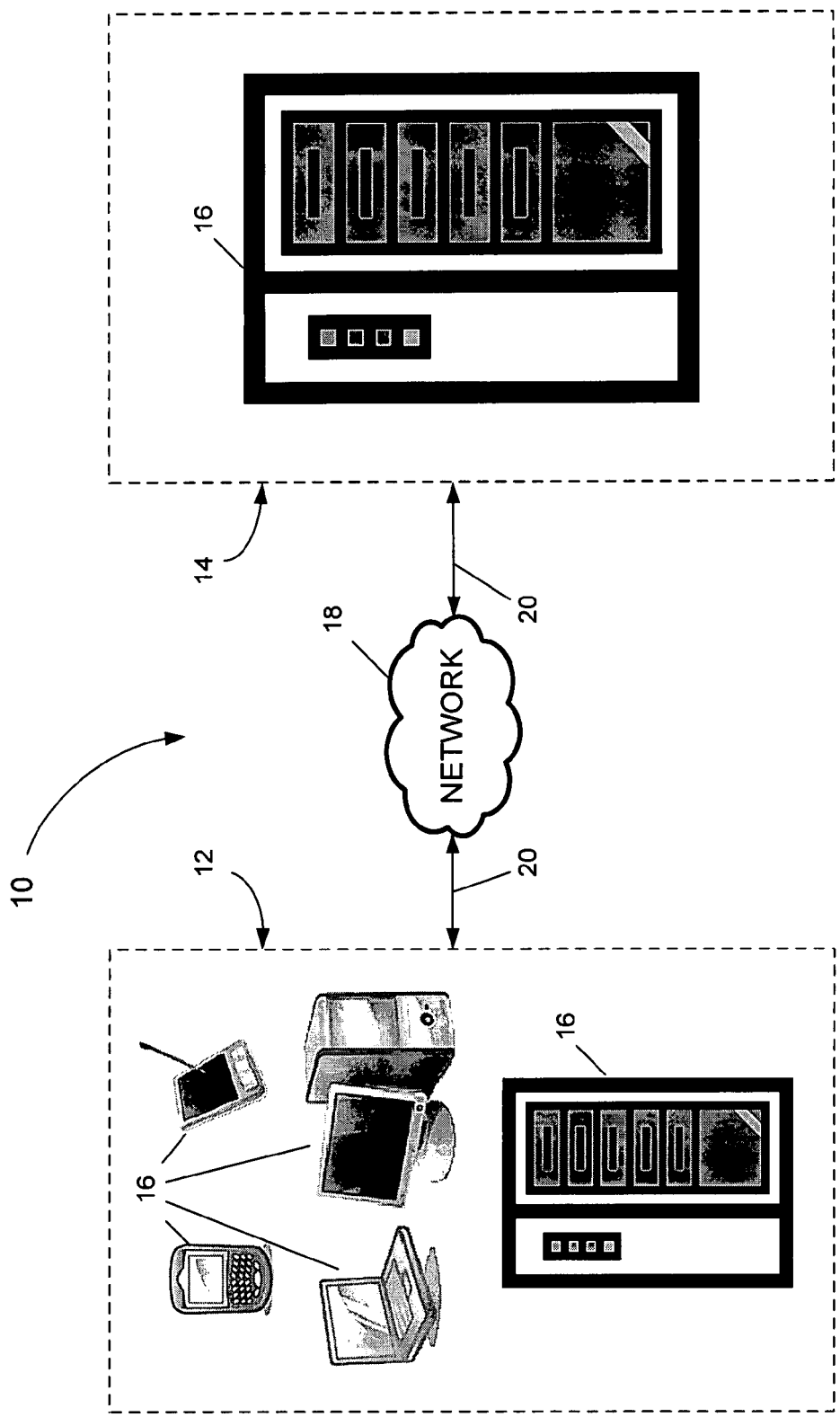
FIG. 1 is a schematic representation of a computing network system.

Referring now to FIG. 1, an exemplary computing network system, generally designated 10, suitable for use with the present disclosure is shown. In the subject embodiment, the computing network system 10 includes a computing device, generally designated 12, and a host device, generally designated 14. It will be understood, however, that the scope of the present disclosure is not limited to the computing network system 10 having a computing device 12 and a host device 14. The computing device 12 and the host device 14 can take the form of any of one or more of a plurality of communication devices 16. Such communication devices 16 include, but are not limited to, mobile devices such as cellular phones and personal digital assistants (PDAs) and computer systems such as laptops, desktops, servers, and mainframes.

A communication network 18 provides direct or indirect communication paths 20 between the computing device 12 and the host device 14. In the subject embodiment, the communication network 18 includes, but is not limited to, local area networks, personal area networks, wide area networks, satellite networks, or the Internet. Communications between components in the computing system network 10 can be done through wired or wireless technologies.

Figure 2:
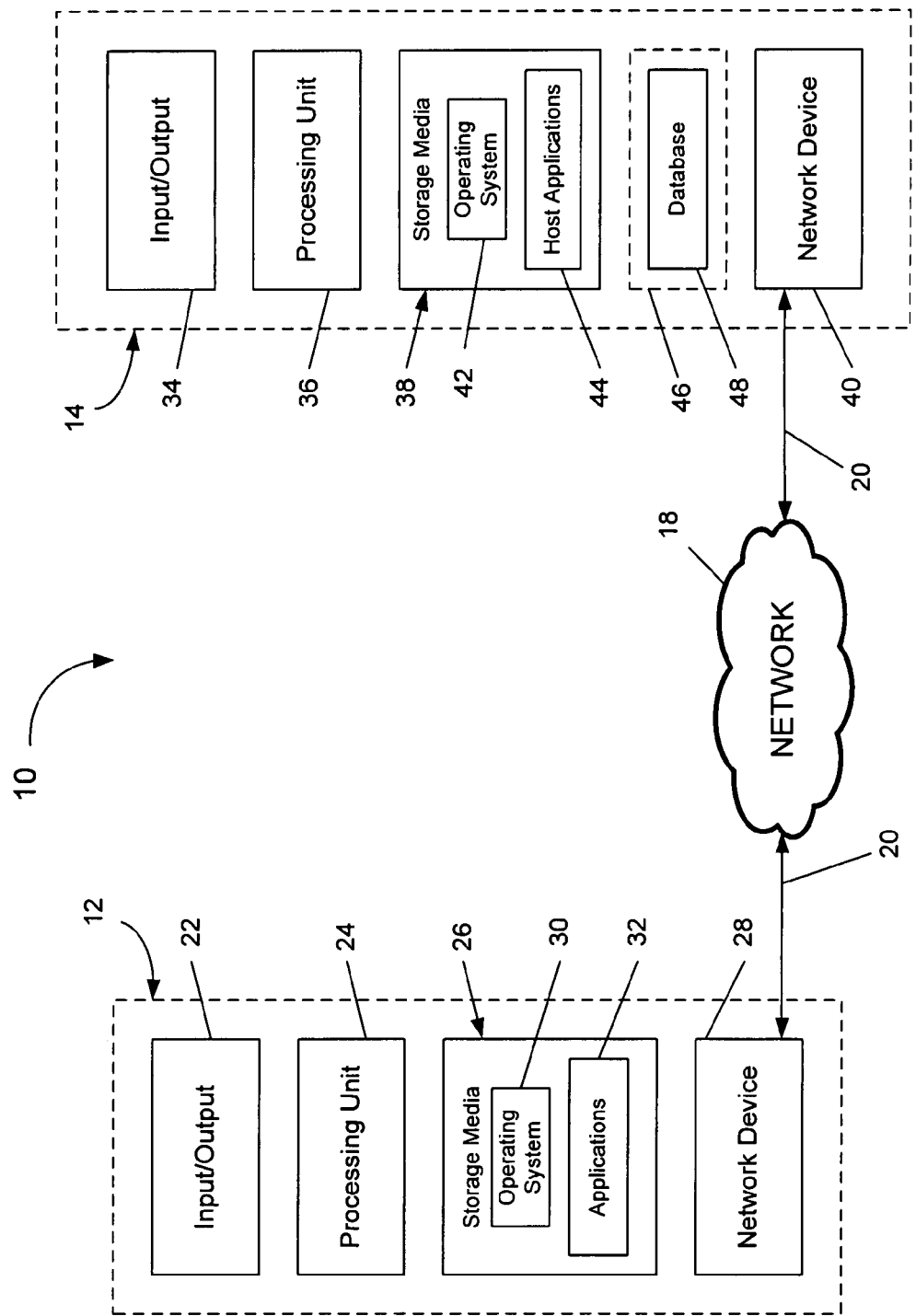
FIG. 2 is a more detailed schematic representation of the computing network system of FIG. 1.

Referring now to FIG. 2, typical elements of the computing network system 10 are shown schematically. In the subject embodiment, the computing device 12 includes an input/output device 22 (e.g., keyboard, mouse, voice input device, touch input device, display, speakers, printer, etc.), a processing unit 24, storage media, generally designated 26, and a network communications device 28.

The storage media 26 can be volatile memory (e.g., RAM), non-volatile memory (e.g., ROM, flash memory, etc.), or a combination of the two. In the subject embodiment, the storage media 26 includes an operating system 30 and one or more applications 32.

The host device 14 includes a host input/output device 34 (e.g., keyboard, mouse, voice input device, touch input device, display, speakers, printer, etc.), a host processing unit 36, host storage media, generally designated 38, and a host network communications device 40.

The host storage media 38 can be volatile memory (e.g., RAM), non-volatile memory (e.g., ROM, flash memory, etc.), or a combination of the two. In the subject embodiment, the host storage media 38 includes a host operating system 42 and host applications 44.

In the subject embodiment, the host device 14 further includes some form of computer readable media such as a data storage device 46 for storing information. The data storage device 46 can include, but is not limited to, any of one or more of memory storage technology (e.g., RAM, ROM, EEPROM, flash memory, etc.), optical storage technology (e.g., CD-ROM, digital versatile disks (DVD), etc.), or magnetic storage technology (e.g., magnetic cassettes, magnetic tape, magnetic disk storage, etc.).

A database 48 is stored on the data storage device 46. In the subject embodiment, the database 48 includes line of business (LOB) information related to the operations of a business, such as accounting, supply chain management, and resource planning applications. Examples of such information include, without limitation, accounting information (e.g., billing, days-on-hand, etc.), human resources information (e.g., employee names, dates of hire, etc.), manufacturing information (e.g., inventory, suppliers, defective parts per million, etc.), marketing information (e.g., customers, pricing information, etc.), product information (e.g., parts lists, design versions, etc.), etc. It will be understood, however, that the scope of the present disclosure is not limited to the database 48 including LOB information.

Database applications are used to access the information stored in the database 48. Typically, database applications are stored on the host device 14 and include an application programming interface (API) through which software applications stored on either the computing device 12 or the host device 14 can request information.

Figure 3:
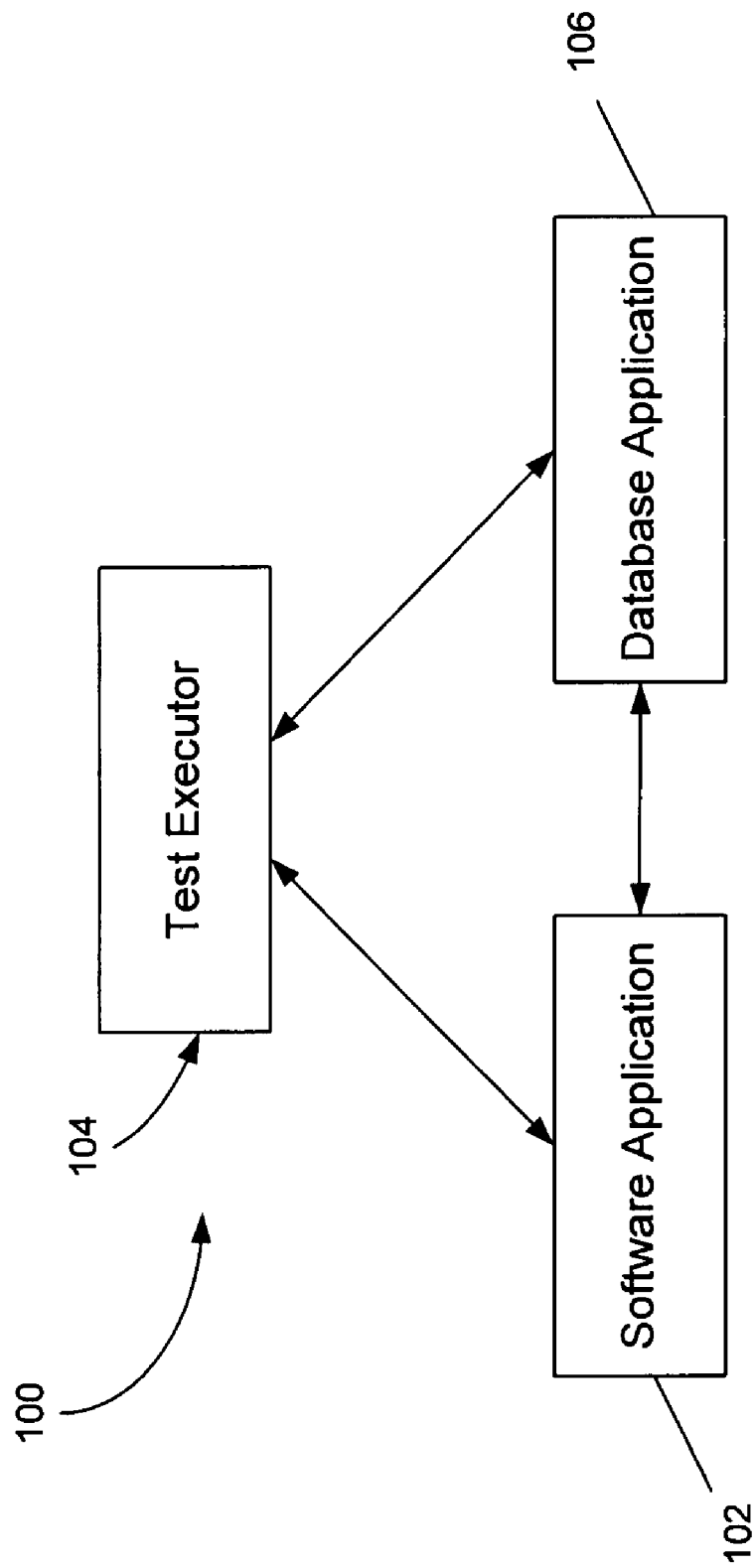
FIG. 3 is a schematic representation of a test framework having features that are examples of aspects in accordance with the principles of the present disclosure.
Figure 4:
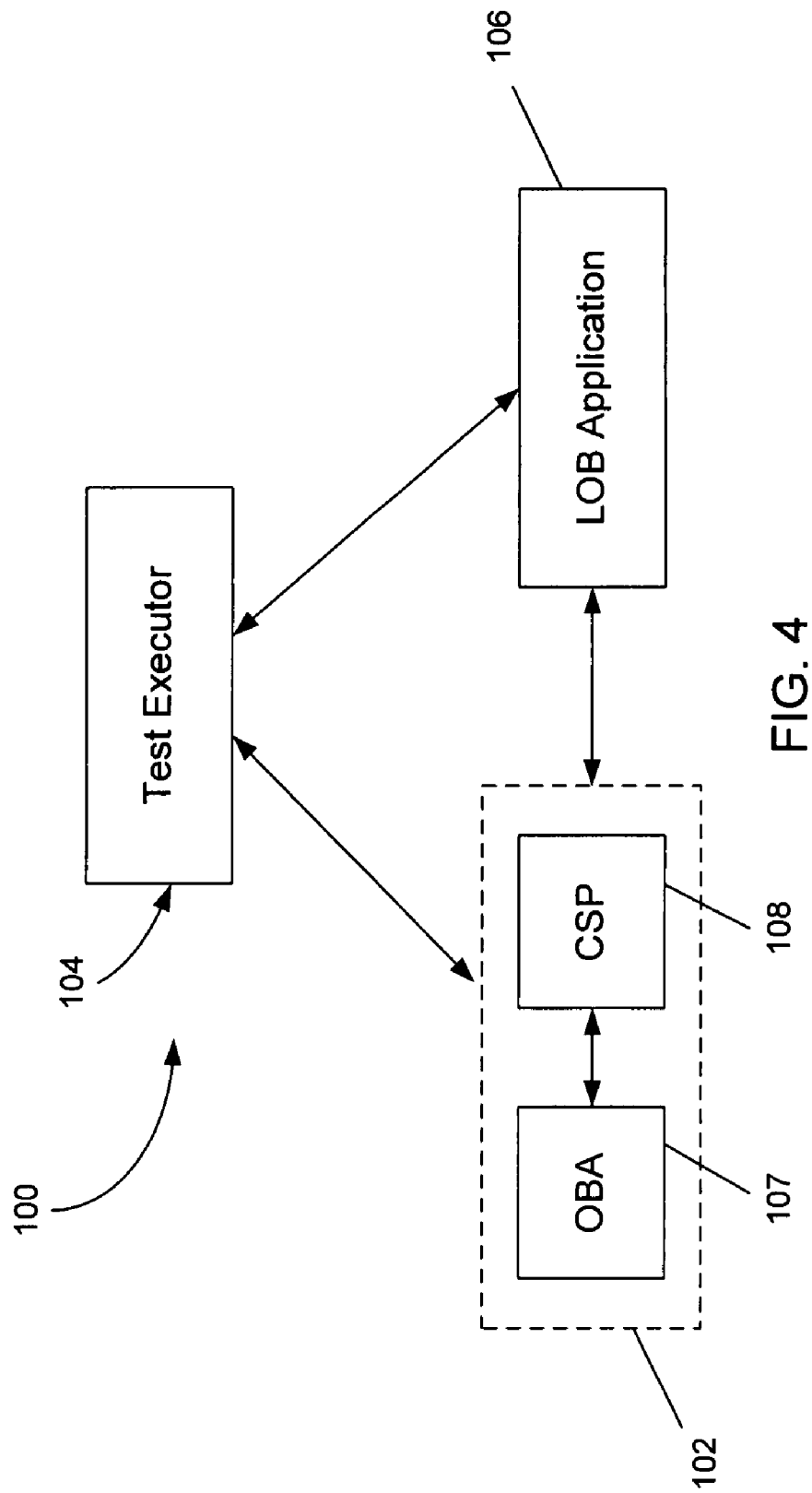
FIG. 4 is an alternate embodiment of the test framework of FIG. 3.

Referring now to FIGS. 3 and 4, a test framework 100 for testing and validating software applications 102 will be described. In the subject embodiment, the test framework 100 includes a test executor, generally designated 104. The test executor 104 controls the testing and validating of the API of the software application 102, which is used for requesting information from a database application 106. The test executor 104 is in communication with the database application 106 and the software application 102, which is also in communication with the database application 106.

In the embodiment shown in FIG. 4, the database application 106 is an LOB application such as SAP, Siebel, Customer Relationship Management (CRM), Enterprise Resource Planning (ERP), or Supply Chain Management (SCM). It will be understood, however, that the database application 106 is not limited to being an LOB application.

In the embodiment shown in FIG. 4, the software application 102 that requests LOB information from the LOB application 106 is an Office Business Application (OBA) 107. The OBA 107 uses applications within MICROSOFT OFFICE® (e.g., Outlook, Word, Excel, etc.) as "front end" applications to request LOB information from the LOB application 106. The use of applications within MICROSOFT OFFICE® as "front end" applications is beneficial since the interface is familiar to the average user. The "front end" applications make requests for LOB information through the API of the OBA 107, which then communicates with the LOB application 106 through the API of the LOB application 106.

In one embodiment, the OBA 107 communicates with the LOB application 106 through a connectivity solution pack (CSP) 108. The CSP 108 is a supplemental software package that provides enhancements to the OBA 107. In one embodiment, the CSP 108 is installed in order to establish communication between the OBA 107 and the LOB application 106 through the API of the LOB application 106. It will be understood, however, that the scope of the present disclosure is not limited to the software application 102 being an OBA 107 or to the OBA 107 communicating with the LOB application 106 through the CSP 108.

Figure 5:
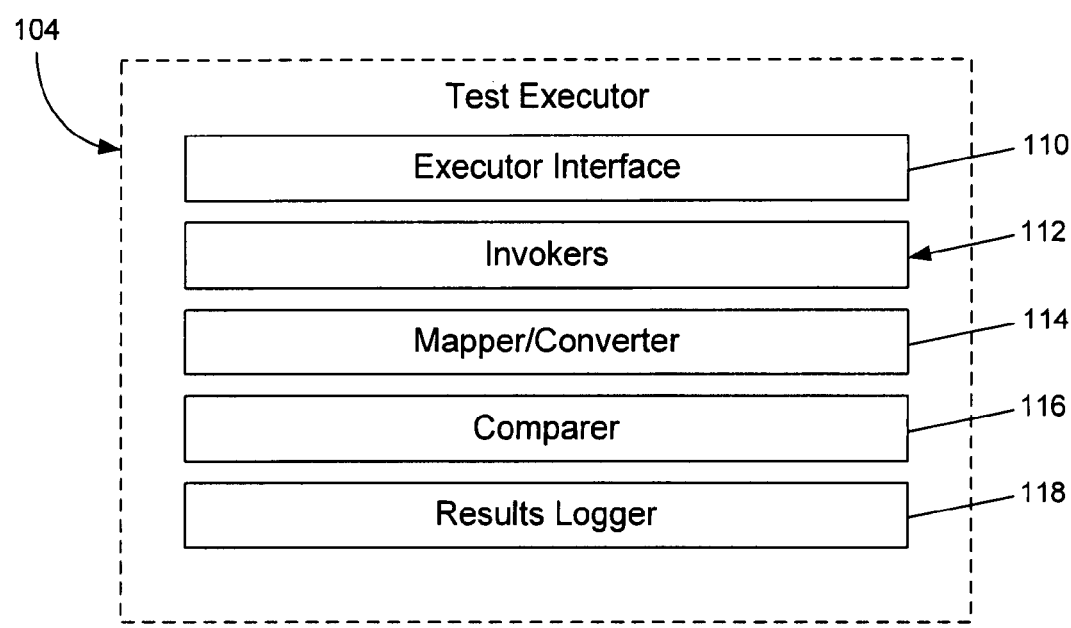
FIG. 5 is a schematic representation of a test executor suitable for use with the test framework of FIG. 3.

Referring now to FIG. 5, the test executor 104 performs various test functions such as loading and executing test case data files, invoking components of the test executor 104, converting results from the software application 102 and/or LOB application 106 based on the test case data files, and comparing and logging the results of the software application 102 and results obtained directly from the LOB application 106. To perform these functions, the test executor 104 includes test components such as an executor interface 110, a plurality of invokers, generally designated 112, a mapper/converter 114, a comparer 116, and a results logger 118.

Figure 6:
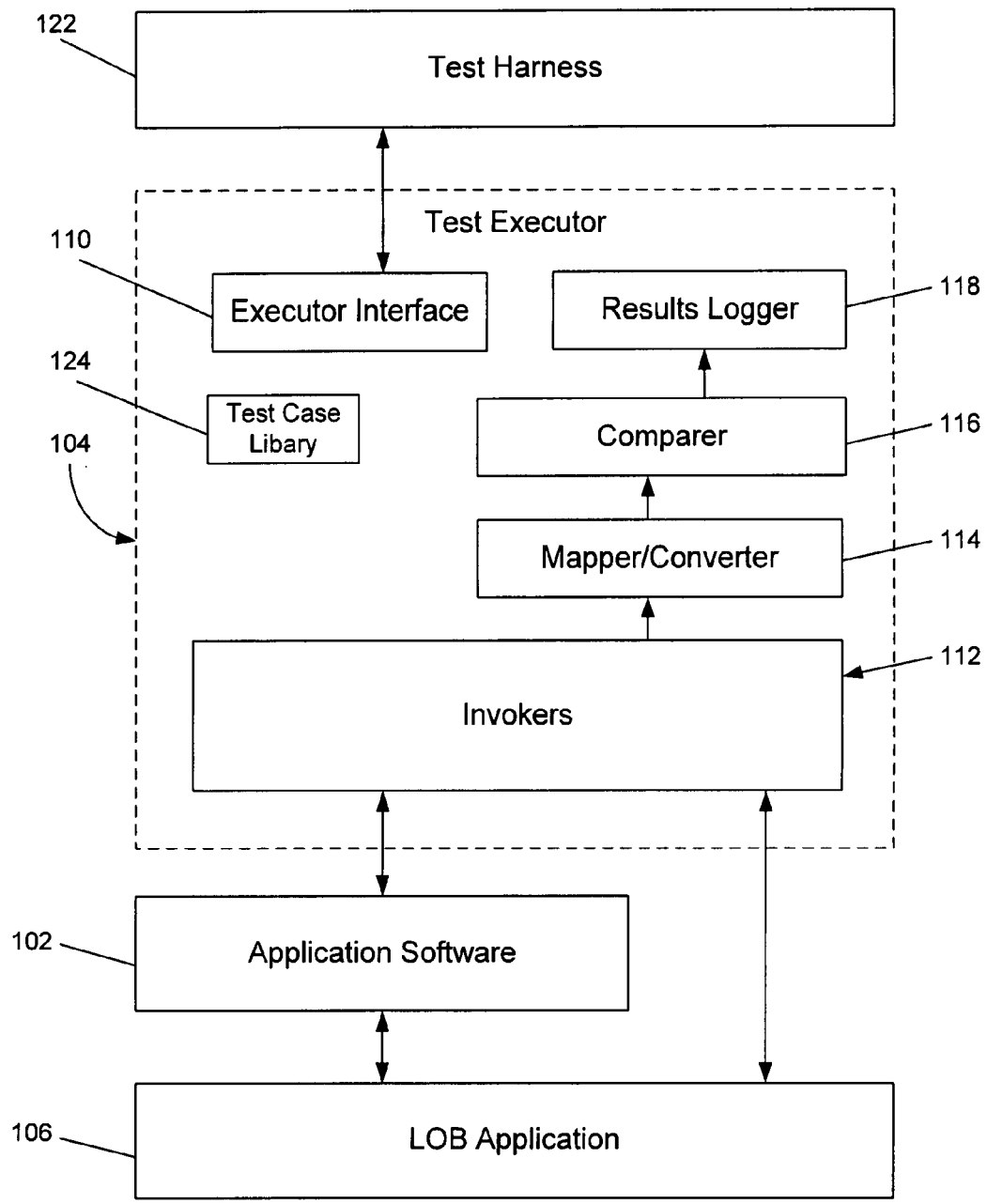
FIG. 6 is a schematic representation of the test framework of FIG. 3.

Referring now to FIG. 6, an exemplary schematic of the test components of the test executor 104 will be described. In one embodiment, the test executor 104 communicates with external applications such as a test harness 122 through the executor interface 110. The test harness 122 includes at least one test case data file having a plurality of test case parameters/conditions under which the software application 102 can be run. Different test harnesses 122 or test case data files can be used to test different software applications 102 or to test different functionalities of the software application 102. The executor interface 110 of the test executor 104 provides a common interface for any test harness 122.

In one embodiment, the executor interface 110 loads a single test case data file from the test harness 122. In another embodiment, the executor interface 110 loads a test suite, which contains multiple test case data files, from the test harness 122. In the subject embodiment, the test case data files are provided to the executor interface 110 of the test executor 104 in an extensible markup language (XML) file format. It will be understood, however, that the scope of the present disclosure is not limited to test case data files being provided to the test executor 104 in XML file formats.

While some test case data files are loaded by the test executor 104 from the test harness 122, the test executor 104 can include a test case library 124 having predefined test case data files. In one embodiment, the predefined test case data files provide testing parameters/conditions to test different operations of the software application 102, such as create, read, update, delete, query, etc. It will be understood, however, that the scope of the present disclosure is not limited to the test executor 104 including predefined test case data files.

After the test case data file is read from the test harness 122, the test executor 104 calls a test case schema and passes the parameters/conditions of the test case data file to the test case schema. In the subject embodiment, the test case schema is programmed in XML Schema. It will be understood, however, that the scope of the present disclosure is not limited to the test case schema being programmed in XML Schema, as other languages for expressing schemas, such as Document Type Definition (DTD), RELAX NG, etc., can be used.

After receiving the parameters/conditions of the test case data file, the test case schema validates the test case data file. To validate the test case data file, the test case schema checks if the test case data file conforms to criteria established in the test case schema. If the test case data file conforms to the criteria of the test case schema, the test case schema provides a testing sequence, which is then executed by the test executor 104 to test the software application 102. In an exemplary embodiment, the testing sequence includes the steps of invoking one or more of the invokers 112, mapping and converting the results of the invokers 112, comparing results of the invokers 112, and logging the results.

Figure 7:
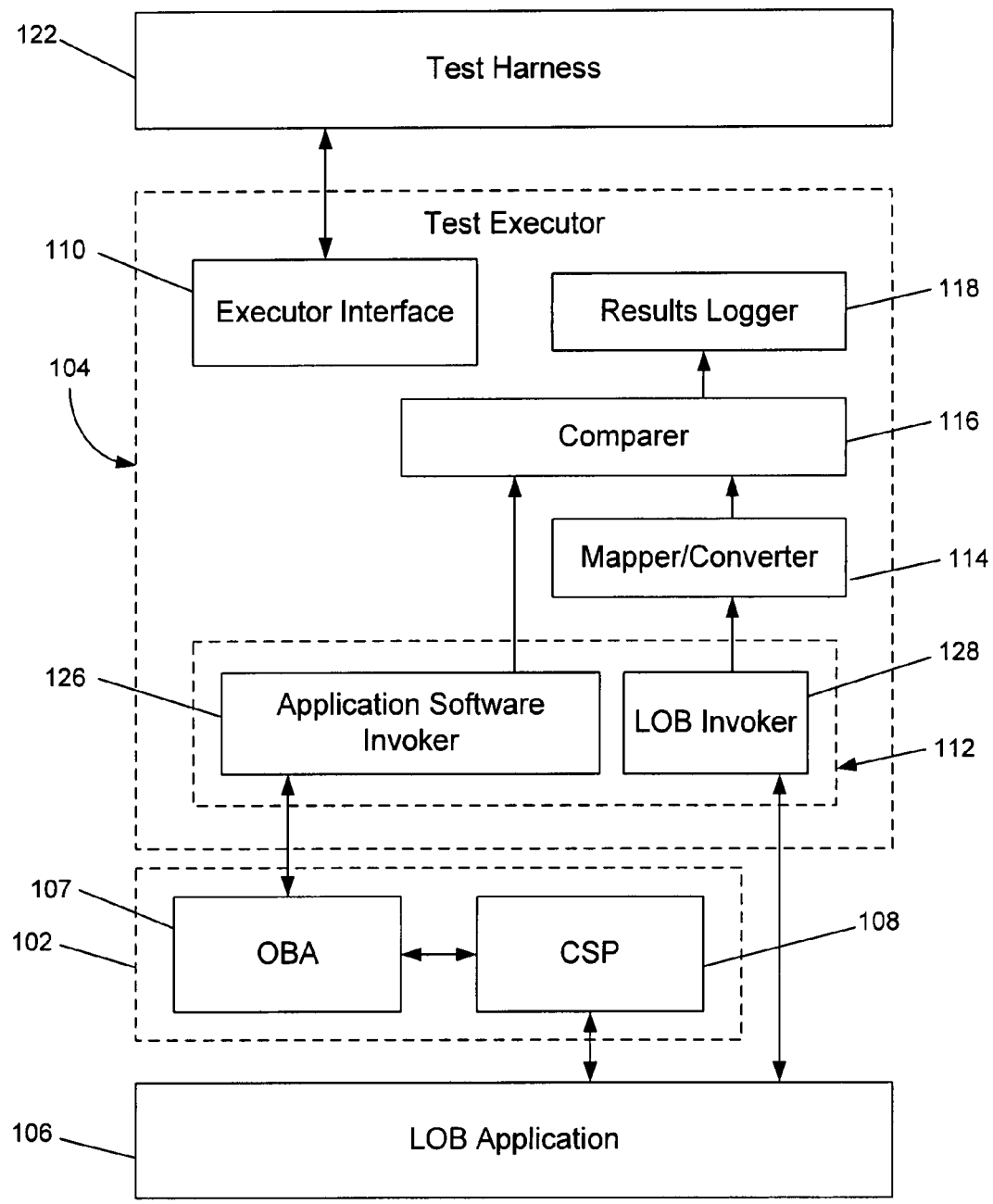
FIG. 7 is another schematic representation of the test framework of FIG. 3.

Referring now to FIGS. 6 and 7, the steps of the testing sequence provided by the test case schema will be described. In the subject embodiment, the test executor 104 invokes the invokers 112 after validating the test case data file and reading the testing sequence from the test case schema. In the subject embodiment, there are two types of invokers 112. One type of invoker 112 is a software application invoker 126 (e.g., Business Data Catalog (BDC) invoker, Workflow (WF) invoker, etc.) while the other type of invoker 112 is a database application invoker 128. In the subject embodiment, the database application invoker 128 is an LOB invoker, although it will be understood that the scope of the present disclosure is not limited to the database application invoker 128 being an LOB invoker.

The software application invoker 126 submits a request to the software application 102 that is consistent with the test case data file provided by the test harness 122. The software application 102 then executes the request and returns a result, which the software application 102 obtained from the LOB application 106. For example, the software application invoker 126 can request the first name and last name for business contacts stored in the LOB information on the database 48. The software application 102 then executes that request and returns information from the LOB application 106 relating to the first name and last name of the business contacts.

The LOB invoker 128 submits a command, which is consistent with the test case data file provided by the test harness 122, directly to the LOB application 106. The LOB application 106 then executes the command and returns a result. For example, the LOB invoker 128 can request the first name and last name for business contacts stored in the LOB information on the database 48. The LOB application 106 then executes that request and returns the information relating to the first name and last name of the business contacts to the LOB invoker 128.

In the example above, the invokers 112 are returning two sets of results. One set is coming from the software application 102, which is querying the LOB application 106, and the other set is coming directly from the LOB application 106. The purpose for the two sets of results from the invokers 112 will be described subsequently.

Each set of results from the invokers 112 is stored in a common file format. In the subject embodiment, and by way of example only, each set of results from the invokers 112 is stored as an XML node object.

In the subject embodiment, the software application invokers 126 and the LOB invokers 128 are part of the same base class. As a result, the test executor 104 can be easily adapted to include additional invokers by adding the new invokers 112 to the base class. It will be understood, however, that the scope of the present disclosure is not limited to the invokers 112 being part of the same base class.

An exemplary test case schema is provided below. The following exemplary test case schema evaluates the API of the software application 102 (e.g., "OBARead") and the LOB application 106 (e.g., CUSTOMER_READ) with respect to a "read" function. The test case schema provided below utilizes the software application invoker 126 and the LOB invoker 128.

```
<TestCase ID="1">
    <MethodGroup Name="OBARead" MethodType="Read"
    Entity="CUSTOMER_READ" LOB="OBAWF" Sequence="1">
        <Method Name="OBARead" ApiName="OBARead" Url="http://company.com/
        CUSTOMER_READ?sap-client=800" UserName="jdoe" Password="johnd"
        MethodType= "Read" Entity= "CUSTOMER_READ" LOB= "OBA"
        Sequence="1">
            <Parameter Name="CUSTOMER_READ" Type="Complex">
                <Parameter Name="FirstName" Type="String">John</Parameter>
                <Parameter Name="LastName" Type="String">Doe</Parameter>
            </Parameter>
        </Method>
    </MethodGroup>
    <MethodGroup Name="CUSTOMER_READ" MethodType="Read" Entity=
    "CUSTOMER_READ" LOB="SAP" Sequence="2">
        <Method Name="CUSTOMER_READ" ApiName="CUSTOMER_READ"
        Url="http://company.com/ CUSTOMER_READ?sap-client=800"
        UserName="jdoe" Password="johnd" MethodType="Read"
        Entity="CUSTOMER_READ" LOB="SAP" Sequence="1">
            <Parameter Name="CUSTOMER_READ" Type="Complex">
                <Parameter Name="FirstName" Type="String">John</Parameter>
                <Parameter Name="LastName" Type="String">Doe</Parameter>
            </Parameter>
        </Method>
    </MethodGroup>
</TestCase>
```

Figure 8:
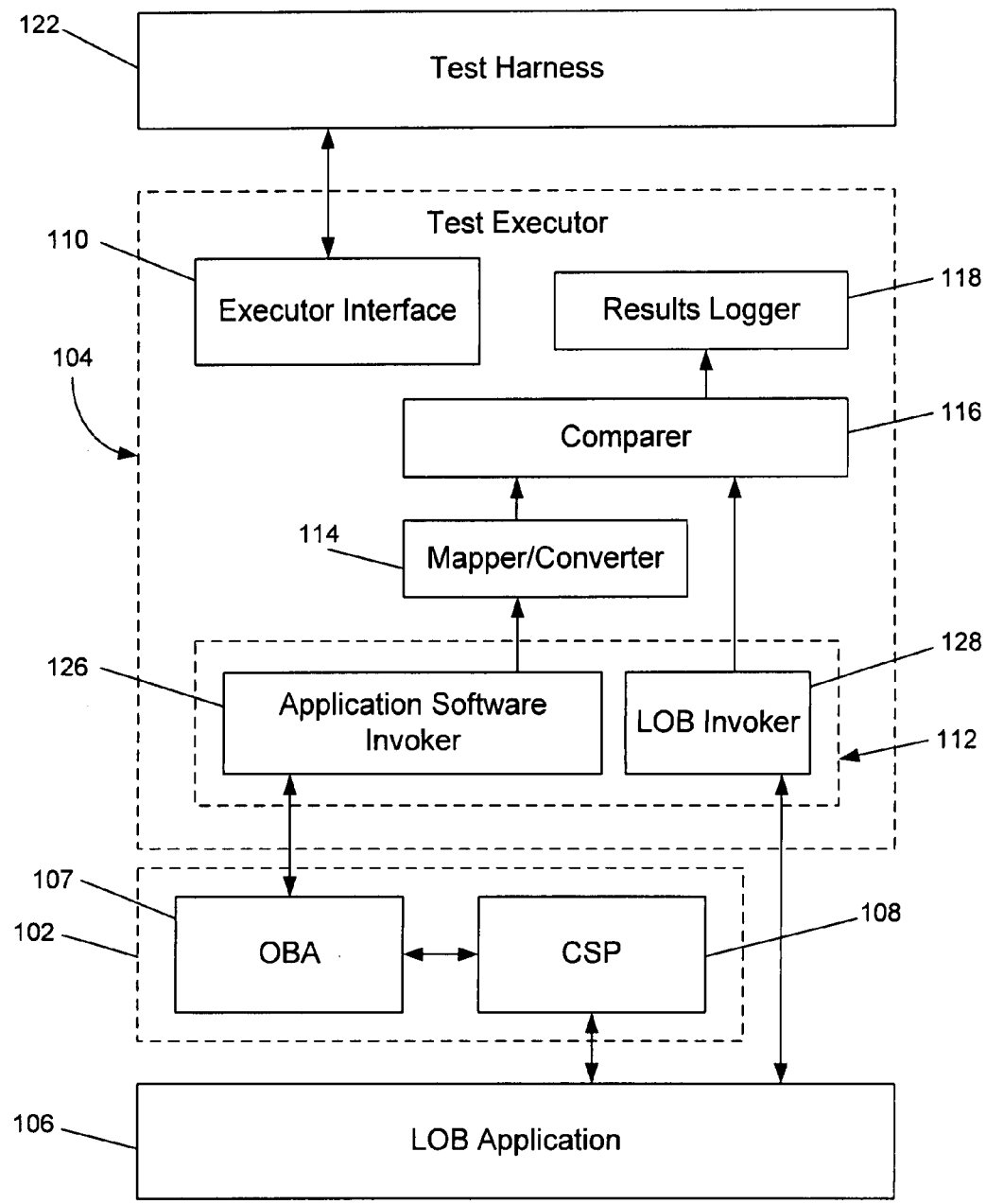
FIG. 8 is schematic representation of an alternate embodiment of the test framework of FIG. 7.
Figure 9:
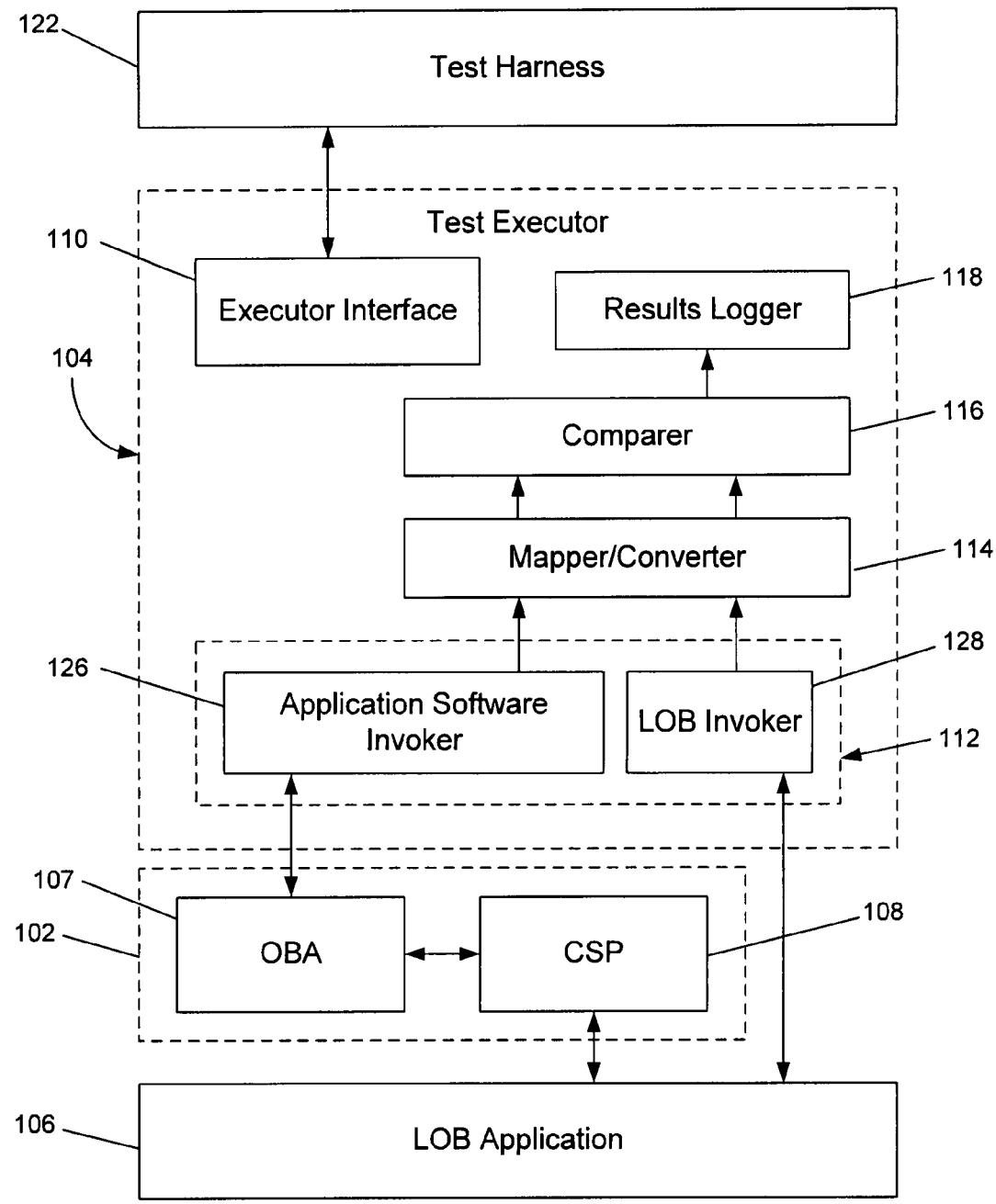
FIG. 9 is a schematic representation of an alternate embodiment of the test framework of FIG. 8.

Referring now to FIGS. 7-9, the results from the invokers 112 are sent to the mapper/converter 114. In the embodiment shown in FIG. 7, only the results from the LOB invoker 128 are sent to the mapper/converter 114. In this embodiment, the mapper/converter 114 converts the results from the LOB invoker 128 so that the results from the LOB invoker 128 are in a similar/common data format as the results from the software application invoker 126. For example, the software application invoker 126 may return results pertaining to the first and last names of business contacts in the following format:

<firstname>John</firstname>
<lastname>Doe</lastname>.

The LOB invoker 128, on the other hand, may return results pertaining to the first and last names of business contacts in the following LOB format:

<fn>John</fn>
<ln>Doe</ln>.

The mapper/converter 114 of FIG. 7 would convert the LOB format into the format of the first and last names from the software application invoker 126. In other words, the mapper/ converter 114 would convert <fn>John</fn> to <firstname>John</firstname> and would convert <ln>Doe</ln> to <lastname>Doe</lastname>.

In the embodiment shown in FIG. 8, only the results from the software application invoker 126 are sent to the mapper/converter 114. In this embodiment, the mapper/converter 114 converts the results from the software application invoker 126 so that the results are in a similar/common data format as the results from the LOB invoker 128. In the example above, the mapper/converter 114 would convert <firstname>John</firstname> to <fn>John</fn> and <lastname>Doe</lastname> to <ln>Doe</ln>.

In the embodiment shown in FIG. 9, both of the results from the software application invoker 126 and LOB invoker 128 are sent to the mapper/converter 114. In this embodiment, the mapper/converter 114 converts the results from the software application invoker 126 and the LOB invoker 128 into some third type of data format. For example, in the example above, the mapper/converter 114 can convert <firstname>John</firstname> to <fname>John</fname> and <fn>John</fn> to <fname>John</fname>.

The mapper/converter 114 uses a mapping file having a mapping schema to make the above conversions. The mapping schema describes each of the fields (e.g., <firstname>, <fn>, <lastname>, <ln>, etc.) that are returned by the software application 102 and the LOB application 106 and how those fields of the software application 102 relate to the fields of the LOB application 106. For example, in the example above, the mapping schema would equate <firstname> from the software application 102 with <fn> from the LOB application 106. While this example shows a simple mapping scheme, the mapping schema is also capable of complex mapping schemes.

Complex mapping schemes are used when one of the software application 102 or the LOB application 106 returns a concatenated field, which is made up of multiple single fields, while the other returns only single fields. For example, in the embodiment shown in FIG. 6, if the software application 102 returns
    <name>John Doe</name>
and the LOB application 106 returns
    <fn>John</fn>
    <ln>Doe</ln>,
the mapping schema provides the description of how to convert <fn> and <ln> into <name>. Referring to the description in the mapping schema, the mapper/converter 114 then employs a merge converter to merge the single fields (e.g., <fn>, <ln>) of the LOB application 106 into a concatenated field (e.g., <name>).

With the results of the software application invoker 126 and the LOB invoker 128 in a similar/common data format, the results are sent to the comparer 116. The comparer 116 checks if the converted results returned from the software application 102 and the LOB application 106 are the same. If the converted results are the same, the software application 102 is retrieving the correct LOB information from the LOB application 106 and, therefore, the API of the software application 102 is functioning properly. If, however, the converted results are not the same, the API of the software application 102 may be improperly functioning.

The results logger 118 logs the results of the comparer 116. In the subject embodiment, the results logger 118 is capable of logging results to a console, a file, XML node object, or to Motif. It will be understood, however, that the scope of the present disclosure is not limited to the results logger 118 logging results to a console, a file, XML node object, or to Motif.

Figure 10:
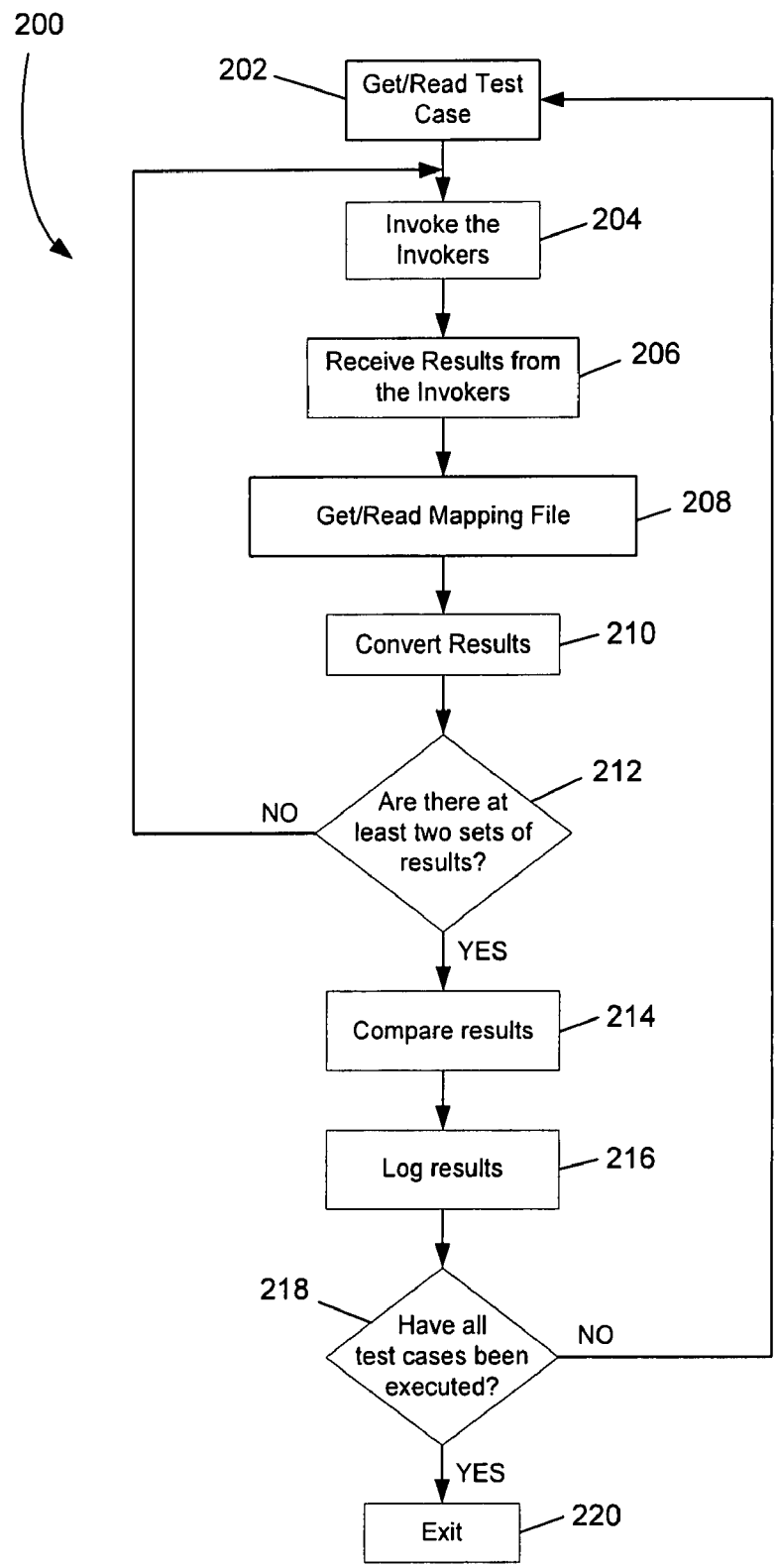
FIG. 10 is an exemplary method for testing software applications that request information from a line of business application having features that are examples of aspects in accordance with the principles of the present disclosure.

Referring now to FIG. 10, an exemplary method 200 for testing the software application 102 that requests LOB information from the LOB application 106 will be described. In step 202, the test executor 104 gets the test case data file and reads that file. As previously described, the test case data file can be provided by the test harness 122 but the scope of the present disclosure is not limited to the test case data file being provided by the test harness 122.

In step 204, the test executor 104 invokes the invokers 112 which are needed to execute the test conditions in the test case data file. As previously described, there are two types of invokers 112, the software application invoker 126 and the LOB invoker 128. In step 206, the test executor 104 receives results from the invokers 112 based on the test parameters/conditions in the test case data file.

After receiving the results from the invokers 112, the test executor 104 reads the mapping file having the mapping schema in step 208. Using the mapping schema, the test executor 104 converts the results from the invokers 112 with the mapper/converter 114 in step 210.

In the subject embodiment, the test executor 104 makes a determination in step 212 as to whether the test executor 104 can make a comparison of results. If the test executor 104 has received only one set of results from the invokers 112, the test executor 104 invokes the invokers 112 in step 204 in order to receive the other set of results. If the test executor 104 has at least two sets of results, those results can be compared in step 214.

In step 216, the results logger 118 of the test executor 104 logs the results from the comparer 116. In step 218, the test executor 104 determines if all the test cases have been executed. If all the test cases have been executed, the test executor 104 exits in step 220. If, however, there are test cases that still need to be executed, the test executor 104 returns to step 202 and gets and reads the next test case.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A test executor for testing an application programming interface of a software application, comprising:
    a plurality of invokers including a software application invoker and a database application invoker, the software application invoker being adapted to communicate with a software application through an application programming interface of the software application and the database application invoker being adapted to communicate with a database application through an application programming interface of the database application, communication between the database application invoker and the database application being in parallel to communication between the software application invoker and the software application such that test results are obtained by the software application invoker independent of test results obtained by the database application invoker;
    a mapper/converter in communication with the plurality of invokers, wherein the mapper/converter converts test results from at least one of the software application invoker and the database application invoker into a common data format; and
    a comparer in communication with the mapper/converter, wherein the comparer compares the test results in the common data format from the mapper/converter to assess the functionality of the application programming interface of the software application.

2. A test executor for testing an application programming interface of a software application as claimed in claim 1, wherein the database application invoker includes a line of business invoker.

3. A test executor for testing an application programming interface of a software application as claimed in claim 2, wherein the mapper/converter is in communication with only the line of business invoker of the plurality of invokers.

4. A test executor for testing an application programming interface of a software application as claimed in claim 1, wherein the mapper/converter is in communication with only the database application invoker of the plurality of invokers.

5. A test executor for testing an application programming interface of a software application as claimed in claim 1, wherein the mapper/converter is in communication with only the software application invoker of the plurality of invokers.

6. A test executor for testing an application programming interface of a software application as claimed in claim 1, further comprising a test case library having predefined test case data files.

7. A test executor for testing an application programming interface of a software application as claimed in claim 6, wherein the predefined test case data files provide testing parameters/conditions to test create, read, update, delete, and query operations in the software application.

8. A test executor for testing an application programming interface of a software application as claimed in claim 6, wherein the test case library includes a test case schema that provides a sequence of test steps.

9. A test executor for testing an application programming interface of a software application as claimed in claim 6, further comprising a mapping file having a mapping schema that is read by the mapper/converter.

10. A test executor for testing an application programming interface of a software application as claimed in claim 1, further comprising a mapping file having a mapping schema that is read by the mapper/converter.

11. A test executor for testing an application programming interface of a software application as claimed in claim 1, further comprising a results logger that is in communication with the comparer.

12. A test executor for testing an application programming interface of a software application as claimed in claim 1, further comprising a test case schema that provides a sequence of test steps.

13. A test executor for testing an application programming interface of a software application as claimed in claim 1, further comprising an executor interface that is adapted for communication with external applications.

14. A test executor for testing an application programming interface of an office business application, the text executor comprising:
a software application invoker adapted to communicate with the office business application through an application programming interface of the office business application;
a line of business invoker adapted to communicate with a line of business application through an application programming interface of the line of business application, communication between the line of business invoker and the line of business application being in parallel to communication between the software application invoker and the office business application such that results are obtained by the line of business invoker independent of results obtained by the software application invoker;
a plurality of invokers including a software application invoker and a database application invoker, the software application invoker being adapted to communicate with a software application through an application programming interface of the software application and the database application invoker being adapted to communicate with a database application through an application programming interface of the database application,
a mapper/converter in communication with at least one of the software application invokers and the line of business invoker, wherein the mapper/converter converts results from at least one of the software application invoker and the line of business invoker such that results from the software application invoker and the line of business invoker are in a common data format;
a comparer in communication with the mapper/converter, wherein the comparer compares the results in the common data format from the mapper/converter to assess the functionality of the application programming interface of the software application; and
a results logger in communication with the comparer for logging results of the comparer.

15. A test executor for testing an application programming interface of an office business application as claimed in claim 14, wherein the mapper/converter converts results from each of the software application invoker and the line of business invoker.

16. A test executor for testing an application programming interface of an office business application as claimed in claim 14, further comprising a test case library having predefined test case data files, wherein the test case library is in communication with the software application invoker and the line of business invoker.

17. A test executor for testing an application programming interface of an office business application as claimed in claim 16, wherein the predefined test case data files provide testing parameters/conditions to test create, read, update, delete, and query operations in the software application.

18. A method for testing an application programming interface of a software application, the method comprising:
reading a mapping file having a mapping schema into a test executor;
reading a test case data file into the test executor, wherein a test harness provides the test case data file to the test executor;
reading a test case schema that provides a sequence of test steps;
invoking a software application invoker, wherein the software application invoker accesses a database through an application and returns results corresponding to test parameters/conditions in the test case data file;
invoking a line of business invoker, wherein the line of business invoker accesses the database and returns results corresponding to test parameters/conditions in the test case data file, communication between the line of business invoker and the database being in parallel to communication between the software application invoker and the database such that results are obtained by the line of business invoker independent of results obtained by the software application invoker;
converting the results returned from at least one of the software application invoker and the line of business invoker into a common data format in accordance with the mapping schema;
comparing results returned from the software application invoker and the line of business invoker to assess the functionality of the application programming interface of the software application; and logging the comparison of the returned results from the software application invoker and the line of business invoker.

19. A method for testing an application programming interface of a software application as claimed in claim 18, only the results of the database application invoker are converted.

20. A method for testing an application programming interface of a software application as claimed in claim 18, further comprising reading a test case schema is provided in a test case library of the test executor.

* * * * *